United States Patent
Daiguji et al.

(10) Patent No.: US 7,014,395 B2
(45) Date of Patent: Mar. 21, 2006

(54) THROWAWAY INSERT AND CUTTING TOOL HAVING THROWAWAY INSERT

(75) Inventors: Hisashi Daiguji, Tsukuba (JP); Yoshihiko Kimura, Iwai (JP)

(73) Assignee: Mitsubishi Materials Corporation, Tokyo (JP)

( * ) Notice: Subject to any disclaimer, the term of this patent is extended or adjusted under 35 U.S.C. 154(b) by 87 days.

(21) Appl. No.: 10/384,453

(22) Filed: Mar. 7, 2003

(65) Prior Publication Data

US 2003/0170079 A1 Sep. 11, 2003

(30) Foreign Application Priority Data

Mar. 11, 2002 (JP) ............................. 2002-066028
Aug. 13, 2002 (JP) ............................. 2002-235906

(51) Int. Cl.
*B23B 27/16* (2006.01)

(52) U.S. Cl. ............................ 407/113; 407/48; 407/61
(58) Field of Classification Search ................ 407/113, 407/42, 48, 53, 61, 62
See application file for complete search history.

(56) References Cited

U.S. PATENT DOCUMENTS

| | | | | |
|---|---|---|---|---|
| 460,639 | A | * | 10/1891 | Holt ............................ 408/230 |
| 4,636,117 | A | * | 1/1987 | Shikata ........................ 407/104 |
| 4,681,488 | A | * | 7/1987 | Markusson .................. 407/114 |
| 4,692,070 | A | * | 9/1987 | Shikata ........................ 407/104 |
| 4,699,549 | A | | 10/1987 | Shimomura et al. |
| 4,946,318 | A | | 8/1990 | David et al. |
| 5,052,863 | A | | 10/1991 | Satran |
| 5,071,292 | A | * | 12/1991 | Satran ........................ 407/116 |
| 5,207,538 | A | | 5/1993 | Satran |
| 5,516,242 | A | | 5/1996 | Andronica |
| 5,593,255 | A | | 1/1997 | Satran et al. |
| 5,718,540 | A | | 2/1998 | Satran et al. |
| 5,791,832 | A | | 8/1998 | Yamayose |
| 5,810,519 | A | | 9/1998 | Vogel et al. |
| 5,921,721 | A | | 7/1999 | Hintze et al. |

(Continued)

FOREIGN PATENT DOCUMENTS

DE 44 34 297 A1 3/1996

(Continued)

OTHER PUBLICATIONS

Patent Abstracts of Japan for JP63-229211 published on Sep. 26, 1988.

(Continued)

*Primary Examiner*—Boyer D. Ashley
*Assistant Examiner*—Sara Addisu
(74) *Attorney, Agent, or Firm*—Darby & Darby

(57) ABSTRACT

A throwaway insert and a cutting tool enable a high speed cutting operation for a metallic material having great ductility such as aluminum and obtaining a vertical wall with a high quality machined surface while improving chip control. The throwaway insert comprises a major cutting edge including a tapered cutting edge connected to a cutting edge of a nose portion, and a curved cutting edge connected to an end of the tapered cutting edge at a connection point. The curved cutting edge is formed so as to extend along an imaginary cylindrical surface whose center axis coincides with the axis of rotation of a tool main body, and tapered cutting edge is formed so as to gradually curve from the imaginary cylindrical surface toward the inside of the imaginary cylindrical surface as the distance from the curved cutting edge increases, and the distance from the nose portion decreases. The throwaway insert is attached to the tool main body in which the surface of the distal end thereof is machined so that surface roughness thereof is less than 3.2 $\mu$m when indicated by the Ry roughness.

12 Claims, 10 Drawing Sheets

U.S. PATENT DOCUMENTS

| | | |
|---|---|---|
| 6,050,752 A | 4/2000 | DeRoche |
| 6,142,716 A | 11/2000 | Jordberg et al. |
| 6,213,691 B1 | 4/2001 | Leeb |
| 6,224,300 B1 | 5/2001 | Baxivanelis et al. |
| 6,540,447 B1 | 4/2003 | Nagata et al. |

FOREIGN PATENT DOCUMENTS

| | | |
|---|---|---|
| DE | 201 15 008 U1 | 12/2001 |
| DE | 100 52 963 A1 | 5/2002 |
| EP | 0 392 729 A1 | 10/1990 |
| EP | 0 699 495 A1 | 3/1996 |
| EP | 0 925 863 A2 | 6/1999 |
| EP | 0 956 921 A2 | 11/1999 |
| EP | 1 122 010 A1 | 8/2001 |
| EP | 0 956 921 A3 | 5/2002 |
| JP | 63-229211 | 9/1988 |
| JP | 2000-141123 | 5/2000 |

OTHER PUBLICATIONS

English Abstract of German Patent DE 44 34 297 A1, published Sep. 13, 1994.

English Abstract of German Patent DE 100 52 963 A1, published Oct. 25, 2000.

English Abstract of Japanese Patent 2000-141123, published May 23, 2000.

\* cited by examiner

THROWAWAY INSERT AND CUTTING TOOL HAVING THROWAWAY INSERT

BACKGROUND OF THE INVENTION

1. Field of the Invention

The present invention relates to a throwaway insert which is attached to a throwaway rotating cutting tool, for example, an end mill or the like, and the present invention also relates to a cutting tool provided with a throwaway insert.

2. Background Art

In recent years, as progress accelerates in the aviation industry, there is greater demand to cut (or to machine) light metal, e.g., aluminum or aluminum alloy such as duralumin. Elements used for an airplane must be cut out of a metal block in order to avoid negative effects of residual stress. A throwaway insert used in such a cutting process is adapted to be able to perform cutting with a relatively large cutting depth, for example, from 16 mm to 20 mm at maximum. A throwaway insert, which is formed such that an outer major cutting edge thereof extends along an imaginary cylindrical surface as viewed in a state in which the insert is attached to tools, is often used in the cases in which vertical walls are machined by cutting.

Due to the great ductility of aluminum, when, in particular, a vertical wall is cut by a throwaway insert attached to a cutting tool, the metallic material located outwardly with respect to a nose portion of the throwaway insert tends to be pulled and plucked off with discharged chips in the vicinity thereof, and the tip portion of the throwaway insert tends to make an extra cut trace in the metallic material. Such a tendency is further reinforced as the radius of the tip portion of the throwaway insert attached to a rotating cutting tool decreases. As a result, a problem is encountered in that an undesired step is formed in the machined vertical wall due to the extra cut trace made by the tip portion of the throwaway insert.

Moreover, in recent years, when an attempt is made to increase productivity of cutting of an element out of a block, the metal removal rate must be increased to as high as 5000 cc/min as an example of machining. However, when, in particular, a metallic material having great ductility, e.g., aluminum, is machined, cut chips tend to be fused and deposited on a major cutting edge due to poor chip control, and a problem is encountered in that the quality of machined surface is degraded.

SUMMARY OF THE INVENTION

Based on the above circumstances, objects of the present invention are to provide a throwaway insert and a cutting tool which enable a great chip control when they are used in a high speed machining of a metallic material, in particular, one having great ductility, e.g., aluminum.

Another object of the present invention is to provide a throwaway insert which enables cutting of a vertical wall with a high quality machined surface.

In order to achieve the above objects, the present invention provides a throwaway insert substantially formed in a polygonal shape comprising: a cutting face as an upper surface thereof, an attaching surface as a lower surface thereof for attaching to a tool main body; a flank as a side surface thereof formed between the cutting face and the attaching surface; a nose portion which is formed at a corner of the cutting face, and which has a substantially arc-shaped cutting edge; and a major cutting edge which is formed along an intersecting ridge between the cutting face and the flank so as to be connected to an end of the cutting edge of the nose portion, and which includes a tapered cutting edge connected to the cutting edge of the nose portion, and a curved cutting edge connected to an end of the tapered cutting edge at a connection point positioned opposite to the nose portion, wherein the curved cutting edge is formed so as to extend alone an imaginary cylindrical surface whose center axis coincides with the axis of rotation of the tool main body, as viewed in a state in which the throwaway insert is attached to the tool main body in such a manner that the nose portion is positioned at an outer periphery of a distal end of the tool main body, and wherein the tapered cutting edge is formed so as to gradually curve from the imaginary cylindrical surface toward the inside of the imaginary cylindrical surface as the distance from the curved cutting edge increases, and the distance from the nose portion decreases.

According to the present invention, because the curved cutting edge is formed so as to extend along an imaginary cylindrical surface whose center axis coincides with the axis of rotation of the tool main body, as viewed in a state in which the throwaway insert is attached to the tool main body, material contacting the imaginary cylindrical surface can be cut out by the curved cutting edge when the tool main body is rotated. At this time, because the generatrix of the imaginary cylindrical surface is in parallel to the center axis thereof, a vertical wall is machined out. The tapered cutting edge is formed along the side edge closer to the nose portion than from the curved cutting edge, and thus the tapered cutting edge is deviated from the rotational locus of the curved cutting edge. Because the tapered cutting edge is formed so as to gradually curve from the imaginary cylindrical surface toward the inside of the imaginary cylindrical surface as the distance from the curved cutting edge increases, and the distance from the nose portion decreases, the tendency of the metallic material located outwardly with respect to the nose portion of the throwaway insert to be pulled and plucked off with discharged chips in the vicinity thereof is reduced, and the tendency of the tip portion of the throwaway insert to make an extra cut trace in the metallic material is also reduced.

In the throwaway insert of the present invention, the tapered cutting edge and the curved cutting edge of the major cutting edge may be connected to each other at the connection point such that the respective tangents thereof drawn at the connection point form a predetermined angle.

Accordingly, because the major cutting edge includes the tapered cutting edge and the curved cutting edge, the tapered cutting edge and the curved cutting edge are connected to each other at the connection point, and the tangent of the tapered cutting edge drawn at the connection point and the tangent of the curved cutting edge drawn at the connection point form a predetermined angle, the chip flow made by the curved cutting edge and the chip flow made by the tapered cutting edge are discontinuous at the connection point; therefore, the chips made by the curved cutting edge and the chips made by the tapered cutting edge grow in different directions, which enables easy separation of these chips from each other. As a result, the metallic material located outwardly with respect to the nose portion of the throwaway insert is prevented from being pulled by the cut chips made by the curved cutting edge, and the tendency of the tip portion of the throwaway insert to make an extra cut trace in the metallic material is effectively reduced.

The angle formed by the tangent of the tapered cutting edge drawn at the connection point and the tangent of the curved cutting edge drawn at the connection point may preferably be set to be in a range from 0° 15' to 5° as viewed in a rotationally projected image. If the angle is set to be below this range, the chip flow made by the curved cutting edge and the chip flow made by the tapered cutting edge are not effectively differentiated. If the angle is set to be above this range, an undesired tapered surface is formed in the vertical machined surface.

The tapered cutting edge may be formed in either a straight shape or a curved shape as long as the tangent thereof drawn at the connection point forms a predetermined angle with the tangent of the curved cutting edge drawn at the connection point. In particular, if the tapered cutting edge is formed so as to gently project toward the outside, a greater distance between the tapered cutting edge and the imaginary cylindrical surface in the vicinity of the nose portion can be ensured when compared with the case in which the tapered cutting edge is formed in a straight shape, and also the tapered cutting edge can be smoothly connected to the cutting edge of the nose portion; therefore, the tendency of the tip portion of the throwaway insert to make an extra cut trace in the metallic material is effectively reduced.

In the throwaway insert of the present invention, the curved cutting edge may be formed so as to project in the direction of rotation of the tool main body, and may be formed such that the distance from the attaching surface gradually decreases as the distance from the nose portion increases.

According to the above configuration, a high speed cutting can be applied to a metallic material having great ductility, e.g., aluminum, due to an excellent chip control. More specifically, because the distance between the curved cutting edge and the attaching surface decreases as the distance from the nose portion increases, the axial rake angle of the curved cutting edge is set to be a positive angle which is greater than the inclination angle of the attaching surface, whereby cutting force can be reduced. Furthermore, because the curved cutting edge is formed so as to project in the direction of rotation of the tool main body, the cutting face connected to the curved cutting edge also projects in the direction of rotation, whereby chip control can be improved when compared with the case in which a straight cutting edge is used instead of the curved cutting edge, or a flat cutting face is used. On the other hand, because, due to the tapered cutting edge, the tendency of the tip portion of the throwaway insert to make an extra cut trace in the metallic material is effectively reduced, and also easy separation of the cut chips made by the tip portion of the throwaway insert from the cut chips made by the curved cutting edge can be achieved, the cut chips made by the curved cutting edge are prevented from being pulled by the cut chips made by the tip portion of the throwaway insert, i.e., the shape of the curved cutting edge and the shape of the cutting face, both of which project in the direction of rotation, effectively contribute to improving separation of the cut chips made by the curved cutting edge.

In the throwaway insert of the present invention, the cutting edge of the nose portion and the tapered cutting edge may preferably be formed in a plane.

As a result, the intersecting angle at the connection point, which is formed by the tangent of the curved cutting edge having a predetermined axial rake angle and the tangent of the tapered cutting edge, can be maximized as viewed in the radial direction of the tool main body. Consequently, the cut chips made by the tapered cutting edge and the cut chips made by the curved cutting edge can be more easily separated.

The present invention further provides a throwaway insert comprising: a cutting face as an upper surface thereof; an attaching surface as a lower surface thereof for attaching to a tool main body; a flank as a side surface thereof formed between the cutting face and the attaching surface; and a major cutting edge which is formed along an intersecting ridge between the cutting face and the flank, and which includes a curved cutting edge, wherein the curved cutting edge is formed so as to extend along an imaginary cylindrical surface whose center axis coincides with the axis of rotation of the tool main body, as viewed in a state in which the throwaway insert is attached to the tool main body, and wherein the curved cutting edge is formed so as to project in the direction of rotation of the tool main body, and is formed such that the distance from the attaching surface gradually decreases as the distance from a proximal end of the tool main body decreases.

According to the above configuration, because a high speed cutting can be applied to a metallic material having great ductility, e.g., aluminum, due to an excellent chip control. More specifically, because the curved cutting edge is formed so as to project in the direction of rotation of the tool main body, the cutting face connected to the curved cutting edge also projects in the direction of rotation, whereby chip control can be improved when compared with the case in which a straight cutting edge is used instead of the curved cutting edge, or a flat cutting face is used.

In the throwaway insert of the present invention, the cutting face connected to the major cutting edge may preferably be formed such that the rake angle thereof gradually increases as the cutting face extends toward the nose portion and the flank connected to the major cutting edge may preferably be formed such that the flank angle of the flank gradually decreases as the flank extends toward the nose portion.

Accordingly, the radial rake angle and flank angle of the major cutting edge are prevented from greatly changing from the distal end to proximal end of the major cutting edge when the throwaway insert is attached to the tool main body in such a manner that a positive axial rake angle is applied to the major cutting edge, and as a result, an appropriate rake angle and a sufficient flank angle can be applied to the major cutting edge along the entire length thereof.

According to the throwaway insert configured as described above, it is possible to restrict change in the wedge angle of the major cutting edge defined by the upper face as the cutting face and the flank from the distal end to proximal end of the major cutting edge, and as a result, the strength of the cutting edge can be ensured along the entire length of the major cutting edge. Consequently, chatter due to insufficient rigidity of the cutting edge and chipping off of the cutting edge during a cutting operation can be avoided, and furthermore, an excellent cutting performance, such as reduced cutting force, can be obtained.

In the throwaway insert of the present invention, the flank connected to the major cutting edge may preferably be formed such that the flank angle thereof gradually decreases as the flank extends away from the major cutting edge and toward the attaching surface.

Accordingly, because change in the flank angle of the cutting edge is restricted, rigidity of the cutting edge can be ensured, and reliability of the cutting edge can be improved.

The throwaway insert of the present invention may further comprise: another major cutting edge and another flank, both of which are provided on a side opposite to the major cutting edge; and a pair of second flanks respectively formed on the flanks connected to the pair of major cutting edge and in the vicinity of the attaching surface so as to increase the flank angles of the flanks, and the pair of second flanks may be formed such that one of the second flanks corresponding to one of the pair of major cutting edges makes surface contact with the tool main body as viewed in a state in which the throwaway insert is attached to the tool main body in such a manner that the other of the pair of major cutting edges is positioned at an outer periphery of the tool main body.

Accordingly, not only is chip control further improved, and plowing wear of the cutting edge effectively restricted, but also attaching and detaching of the throwaway insert with respect to the tool main body are facilitated, and the throwaway insert can be stably attached to the tool main body by surface contact.

In the throwaway insert of the present invention, at least the cutting face may preferably be finished by lapping.

Accordingly, a high speed cutting can be applied to a metallic material having great ductility, e.g., aluminum while preventing fused deposition of material during cutting.

The present invention further provides a cutting tool comprising: a tool main body; and the throwaway insert according to the present invention provided at the distal end of the tool main body.

In the cutting tool of the present invention, the surface roughness of the distal end of the tool main body may preferably be less than 3.2 μm when indicated by the Ry roughness (better surface roughness than 3.2 μm Ry).

Accordingly, a high speed cutting can be applied to a metallic material having great ductility, e.g., aluminum while preventing fused deposition of the material during cutting, and while improving chip dischargeability.

The surface of the distal end of the tool main body may preferably be plated with nickel or the like, and/or may be coated with material having lubricity such as DLC (Diamond-Like Carbon), WC/C (tungsten Carbide/Carbon), $MoS_2$, CrN, TiN, $Al_2O_3$, or the like.

In particular, if the tool main body is formed in a substantially cylindrical shape, if a projected portion is formed at the distal end of the tool main body where the throwaway insert is to be attached, and if a concave pocket is formed in the projected portion in which the throwaway insert is to be received, the surface roughness of the surfaces of the projected portion and/or of the pocket may preferably be less than 3.2 μm, and moreover, the surfaces may preferably be plated and/or coated.

Furthermore, in the cutting tool of the present invention, the diameter of the imaginary cylindrical surface may preferably be indicated on the tool main body.

Accordingly, when a cutting operation is performed using a numerically controlled (NC) machine tool to which the cutting tool of the invention is attached, the cutting operation can be easily performed without necessity of measuring the rotational radius of the cutting edge before the cutting operation for correcting a cutting operation program in order to correct machining error due to variation in the diameter of the imaginary cylindrical surface caused by manufacturing variation of an individual tool main body, i.e., due to variation in the rotational radius of the cutting edge.

DETAILED DESCRIPTION OF THE PREFERRED EMBODIMENTS

Figure 1:
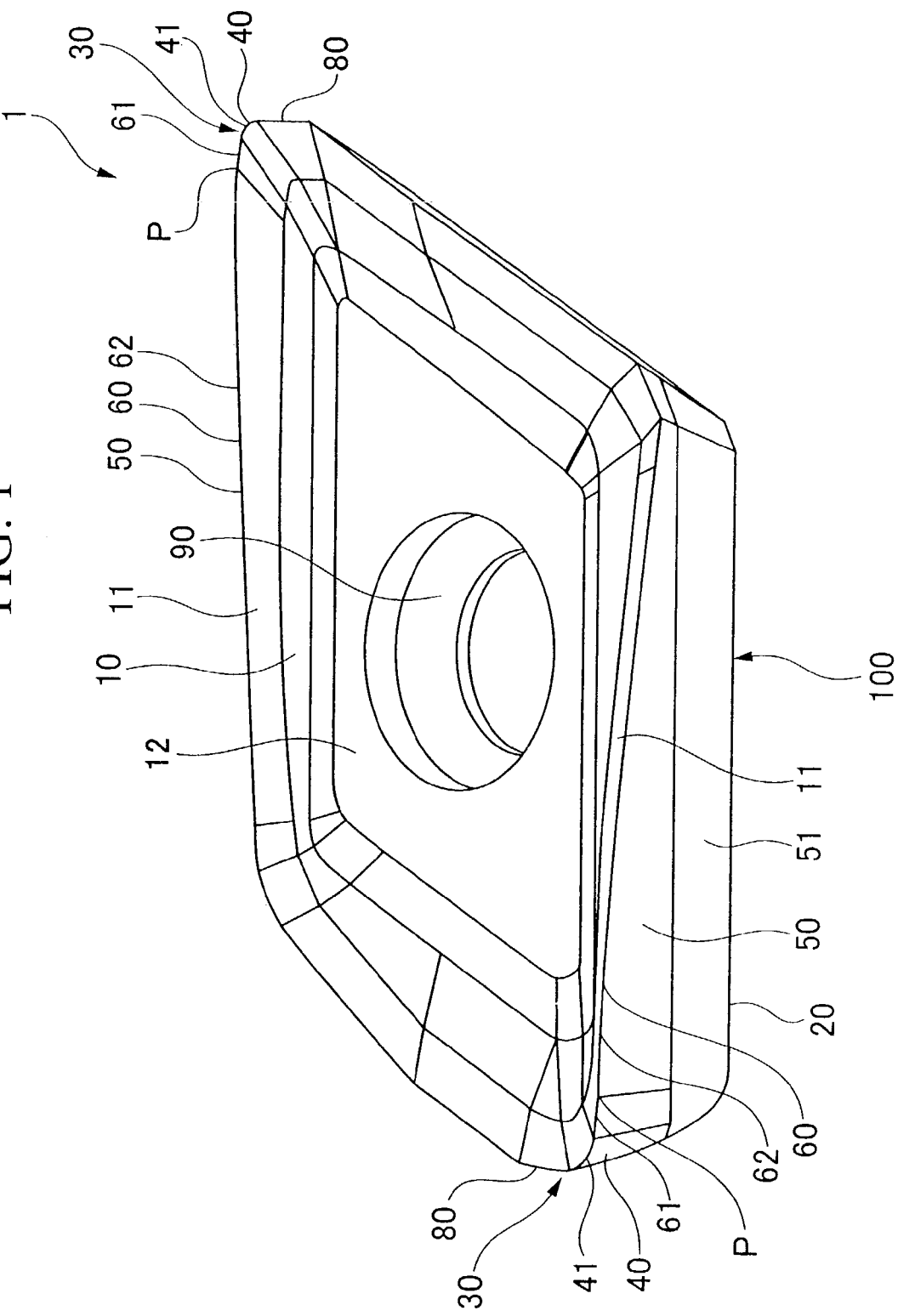
FIG. 1 is a perspective view showing an example of a throwaway insert as an embodiment of the present invention.
Figure 2:
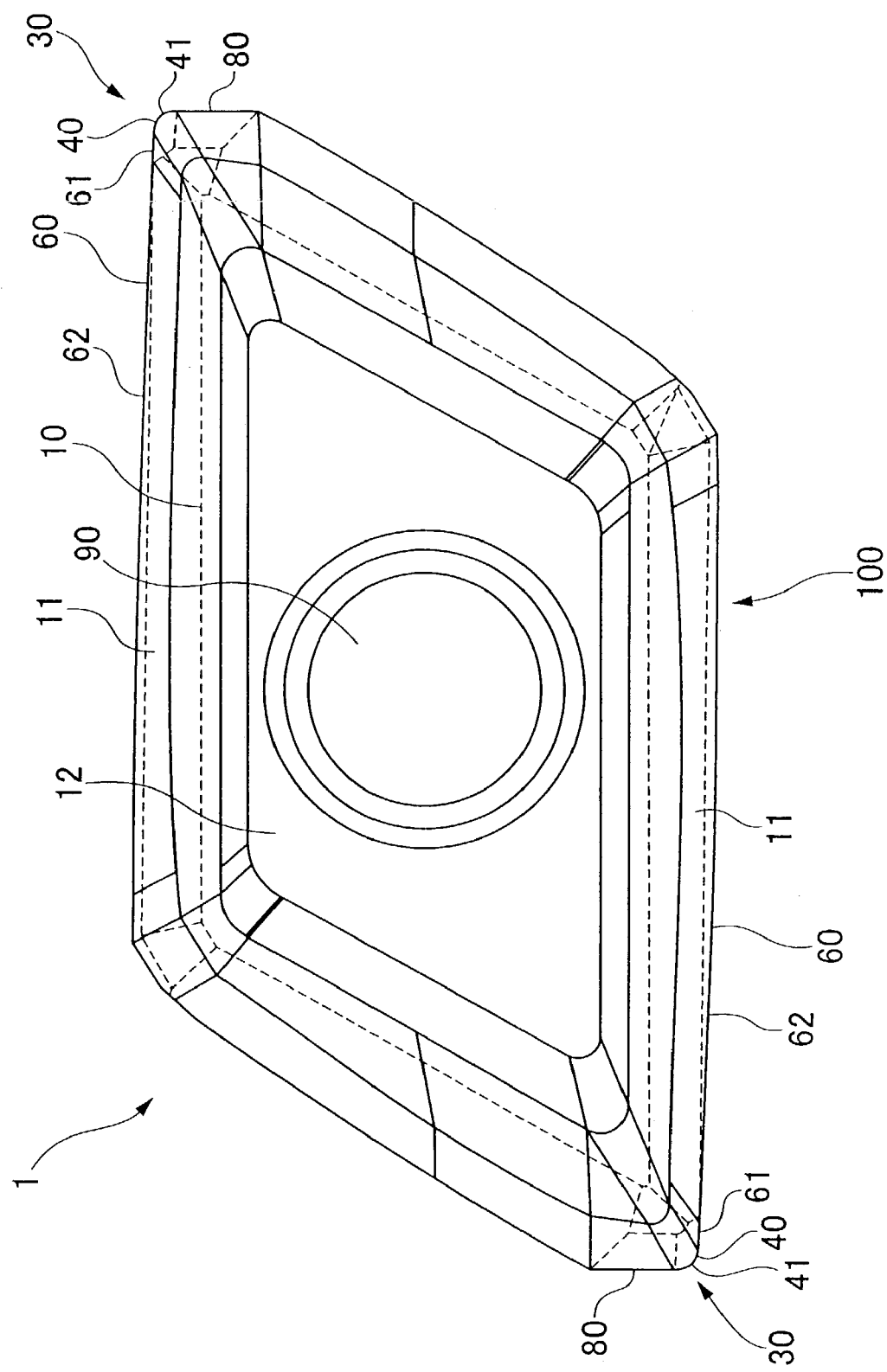
FIG. 2 is a plan view showing the throwaway insert shown in FIG. 1.
Figure 3:
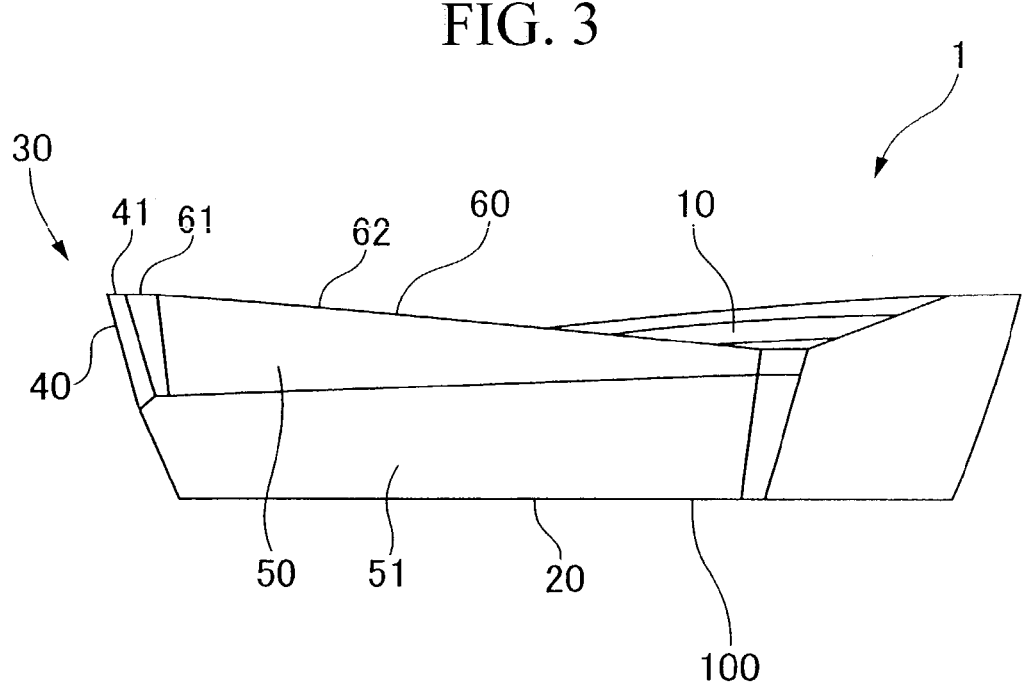
FIG. 3 is a side view showing the throwaway insert shown in FIG. 1.
Figure 4:
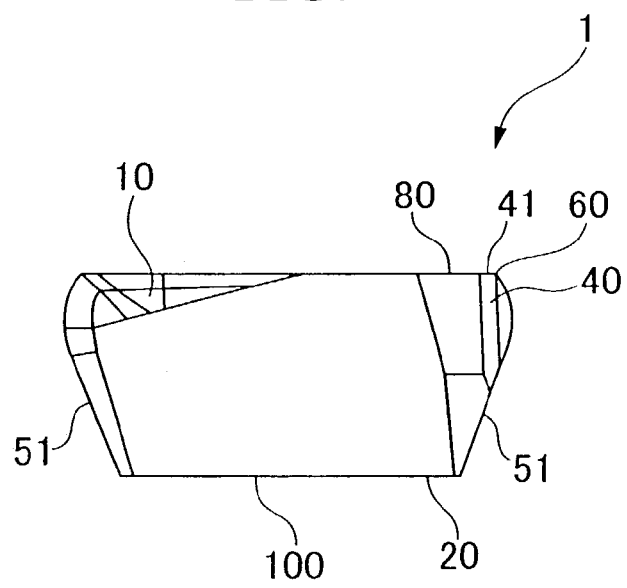
FIG. 4 is a front view showing the throwaway insert shown in FIG. 1.

A throwaway insert according to the present invention will be explained below with reference to the appended drawings.

A throwaway insert 1 shown in FIGS. 1 to 4 is made of, for example, cemented carbide. The insert body 100 of the throwaway insert 1 is substantially formed in a polygonal shape, and is, in particular, substantially formed in a tetragon, and more specifically, the insert body 100 is substantially formed in a parallelogram as shown. The throwaway insert 1 comprises a cutting face 10 as an upper surface of the insert body 100 and an attaching surface 20 as a lower surface of the insert body 100 for attaching to a tool main body 200 such as an end mill (see FIG. 5).

The throwaway insert 1 further comprises nose portions 40 which are respectively formed at diagonally opposing corners 30 of the parallelogram forming the cutting face 10. There are formed substantially arc-shaped cutting edges 41 on the intersecting ridges between the nose portions 40 and the cutting face 10, respectively. In the throwaway insert 1, the included angles of the corners 30 are set to be acute angles, for example, 60 degrees, so that the throwaway insert 1 is applicable not only to transverse feeding but also to inclined feeding while ensuring a ramping angle.

The throwaway insert 1 further comprises flanks 50 opposing each other in side surfaces between the cutting face 10 and the attaching surface 20 and adjacent to the nose portions 40. There are formed major cutting edges 60 on the intersecting ridges, which oppose each other, between the flanks 50 and the cutting face 10. Each of the major cutting edges 60 is connected to an end of each of the cutting edges 41 of the nose portions 40. On the other hand, there are formed minor cutting edges 80, which function to finish the surface of a workpiece being cut, so as to be connected to the other ends of the cutting edges 41 of the nose portions 40 opposite to the main cutting edges 60. Each of the minor cutting edges 80 is formed to be substantially perpendicular to one of the main cutting edges 60, and more specifically, is formed to be perpendicular to the generatrix of an imaginary cylindrical surface, which will be further explained below, along which the main cutting edges extend.

The main cutting edge 60 will be explained in more detail. The major cutting edge 60 comprises a tapered cutting edge 61 which is connected to the cutting edge 41 of the nose portion 40, and a curved cutting edge 62 which is connected to an end of the tapered cutting edge 61 at a connection point P positioned opposite to the nose portion 40.

Figure 5:
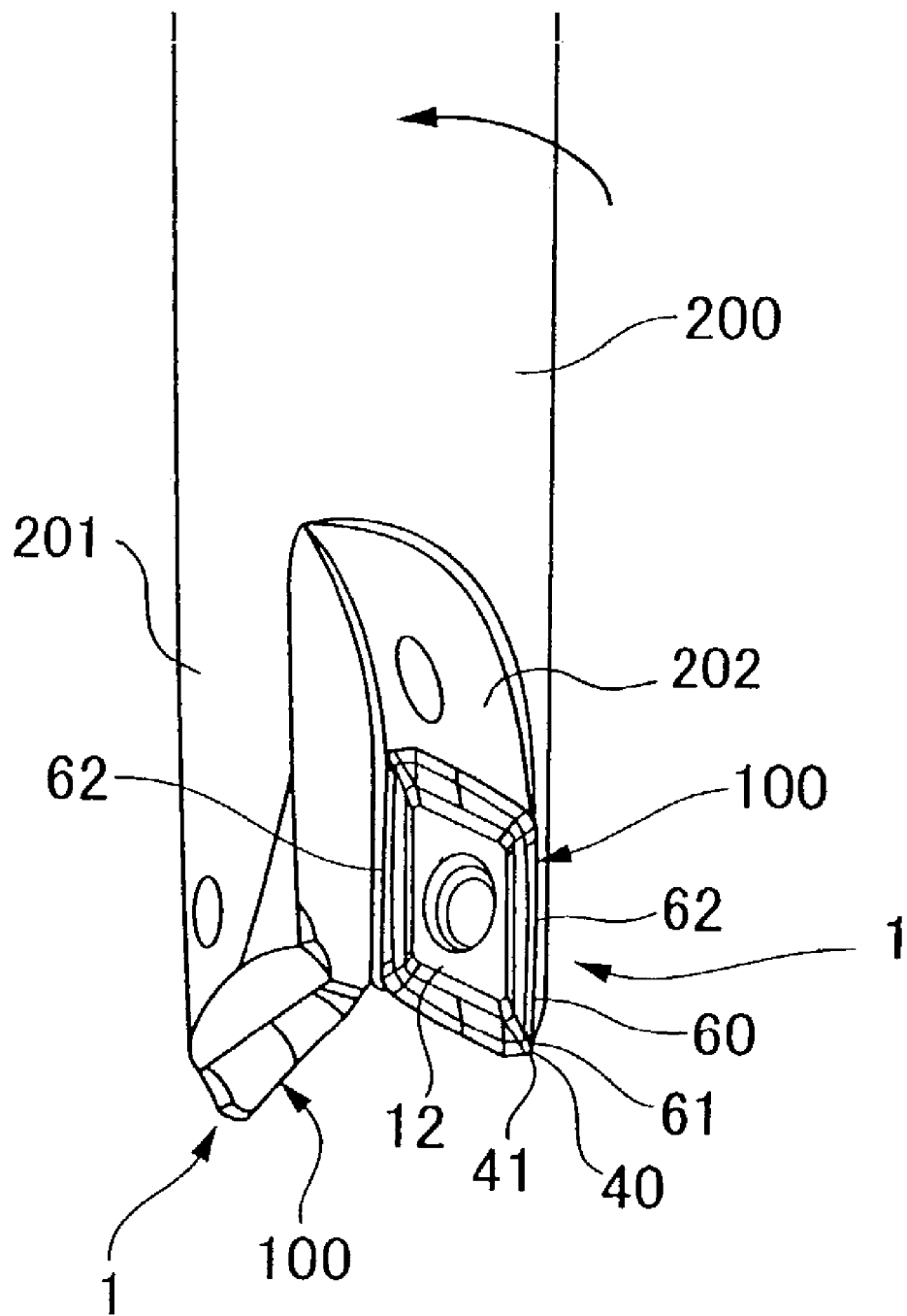
FIG. 5 is a perspective view showing a state in which the throwaway insert shown in FIG. 1 is attached to a tool main body.
Figure 6:
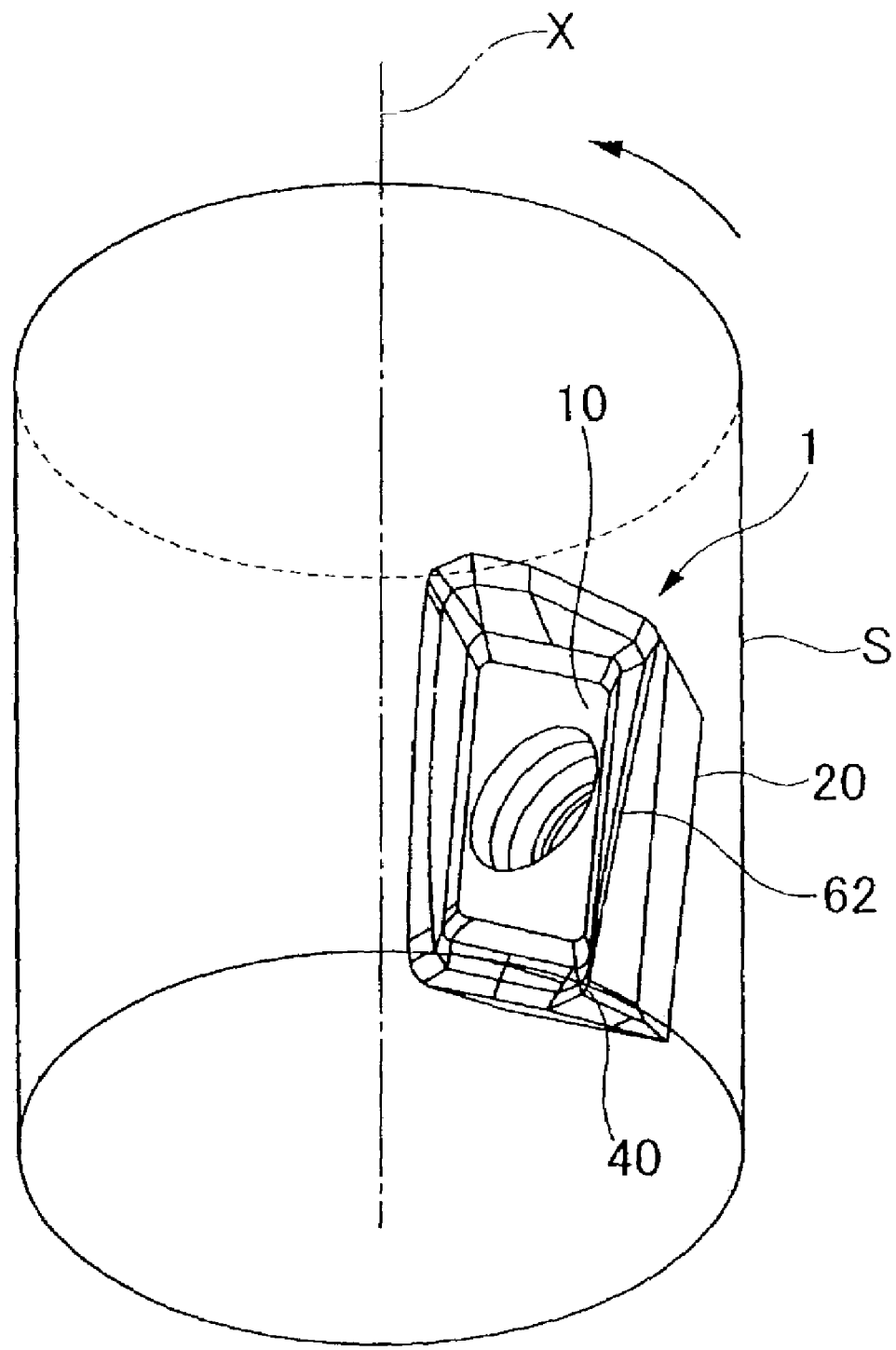
FIG. 6 is a perspective view for explaining that a cylindrical surface is formed as a cut surface made by a curved cutting edge of the throwaway insert shown in FIG. 1 when the cutting operation is performed with the throwaway insert being attached to the tool main body.
Figure 7:
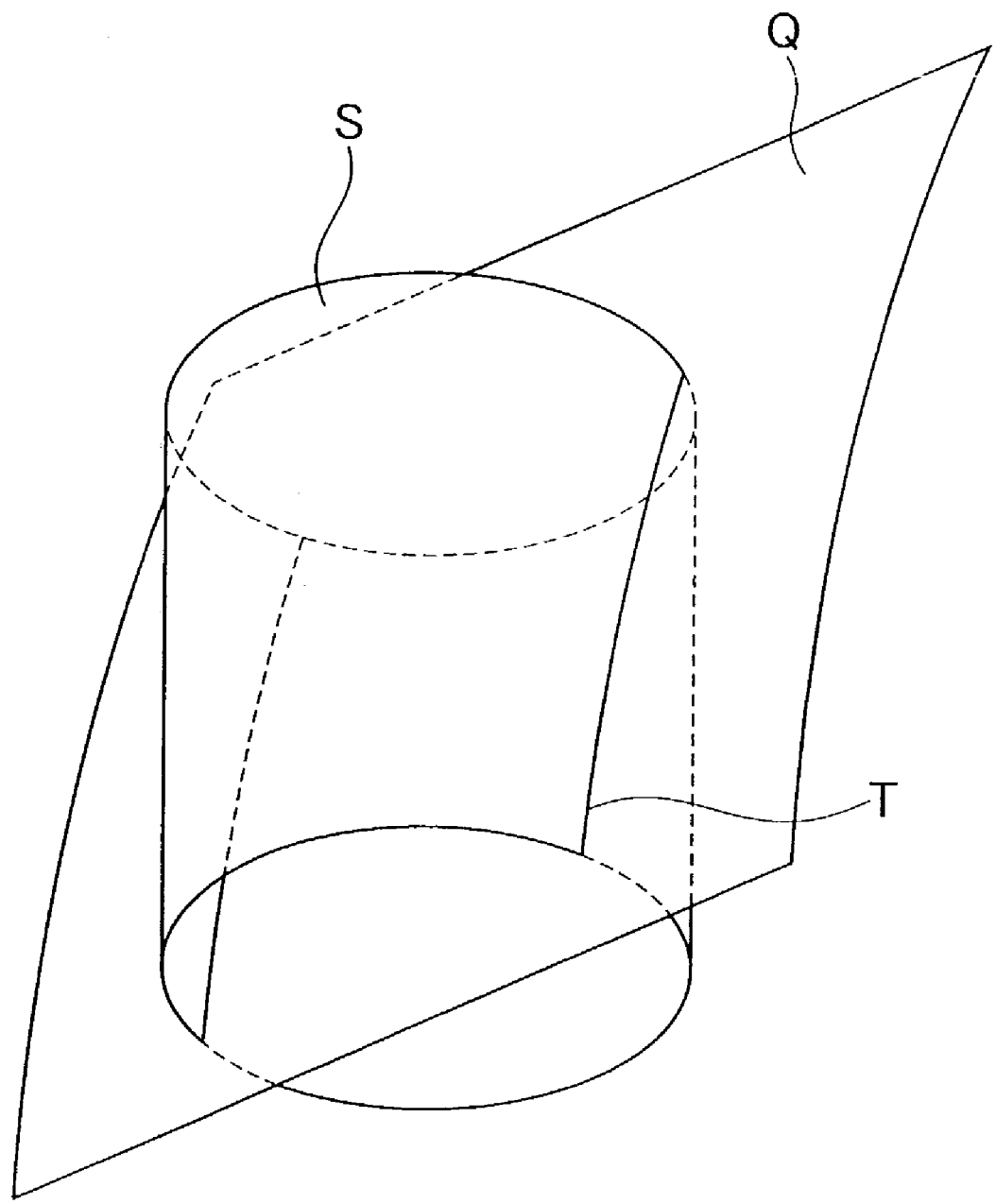
FIG. 7 is a perspective view for explaining the curved shape of the curved cutting edge.
Figure 8:
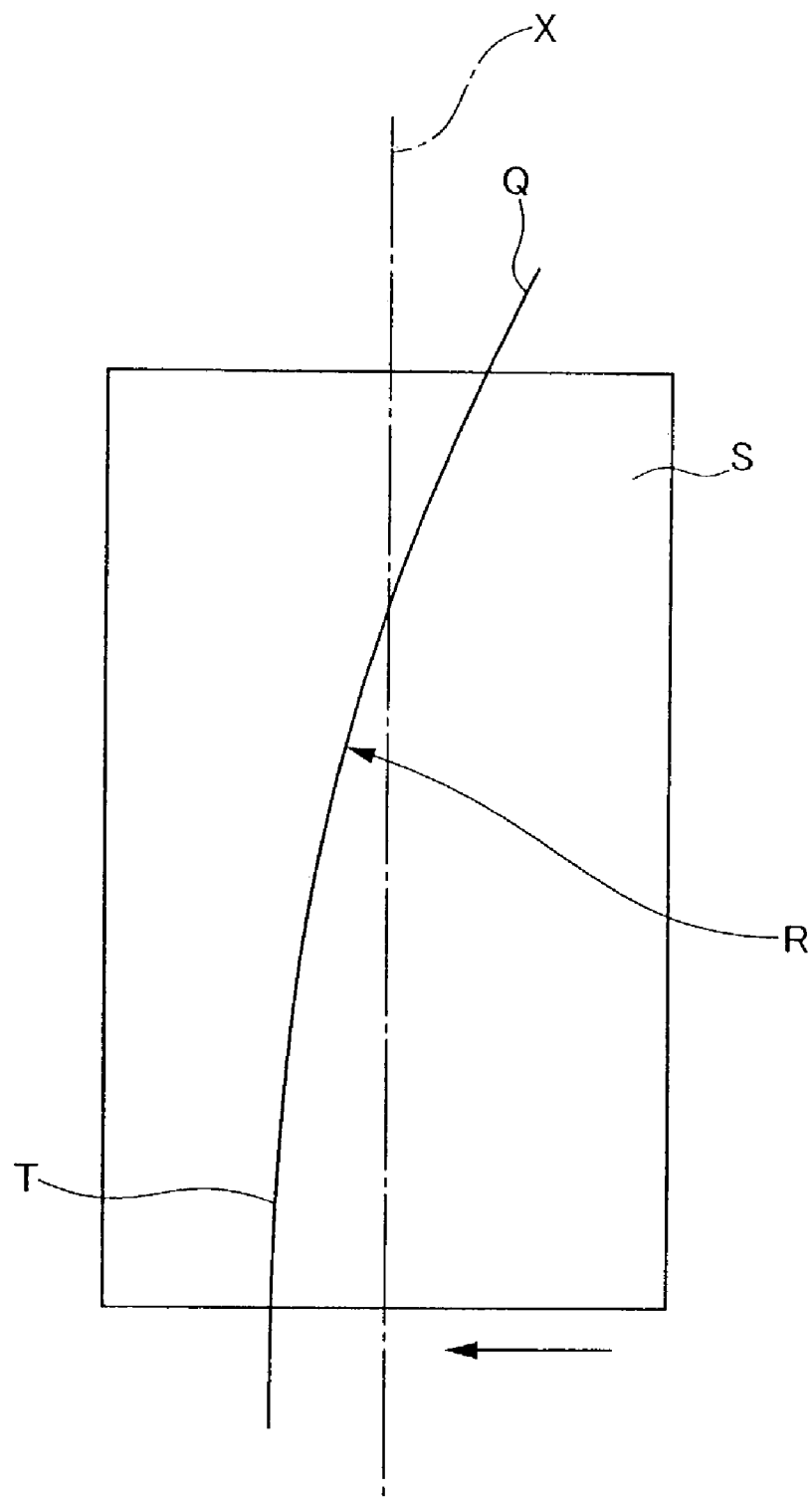
FIG. 8 is a side view showing the cylindrical surface and the curved surface, shown in FIG. 7, as viewed perpendicularly to an axis of rotation.

As shown in FIG. 5, the curved cutting edge 62 is formed so as to extend along an imaginary cylindrical surface S whose center axis coincides with the axis of rotation X of the tool main body 200 when it is in a state in which the throwaway insert 1 is attached to a pocket 202 (see FIGS. 5 and 13), which is formed by removing a portion of a projected portion 201 provided at a distal end of a substantially cylindrical tool main body 200, in such a manner that the cutting face 10 is directed in the direction of rotation of the tool main body 200 (indicated by the arrows in FIGS. 5 and 6) and that the nose portion 40 is positioned at an outer periphery of the distal end of the tool main body 200. In other words, the curved cutting edge 62 is formed so as to be curved substantially along an oval shape and so as to be projected toward the outside as viewed from the cutting face as shown in FIG. 6. FIG. 7 is a diagram facilitating understanding of a curved line along which the curved cutting edge 62 is formed. In FIG. 7, an intersecting line T is shown, along which the curved cutting edge 62 is formed, and which is formed as an intersecting line between the imaginary cylindrical surface S and a curved surface Q that has inclination with respect to the axis of rotation X and that slightly projects in the direction of rotation of the tool main body 200. Accordingly, the curved cutting edge 62 is formed so as to be a curved shape which coincides with a portion of a substantially oval section of the imaginary cylindrical surface S as viewed in the direction substantially perpendicular to the curved surface Q. Moreover, as can be seen in FIG. 8 showing the cylindrical surface and the curved surface, shown in FIG. 7, as viewed perpendicularly to the axis of rotation, because the intersecting line T projects in the direction of rotation (indicated by the arrow in FIG. 8) of the tool main body 200 with a radius of curvature R, and because the intersecting line T is inclined with respect to the axis of rotation X in the direction opposite to the direction of rotation as the distance from a proximal end of the tool main body 200 decreases, the curved cutting edge 62 is formed so as to project toward the cutting face 10, i.e., in the direction of rotation of the tool main body 200 as viewed from the flank 50, and so that the distance from the attaching surface 20 gradually decreases as the distance from the nose portion 40 increases. In addition, a portion of the cutting face, which extends from the curved cutting edge 62 having projected shape toward the center of the tool main body 200, is formed as a convex surface 11 projecting in the direction of rotation of the tool main body 200 as the curved cutting edge 62.

Figure 9:
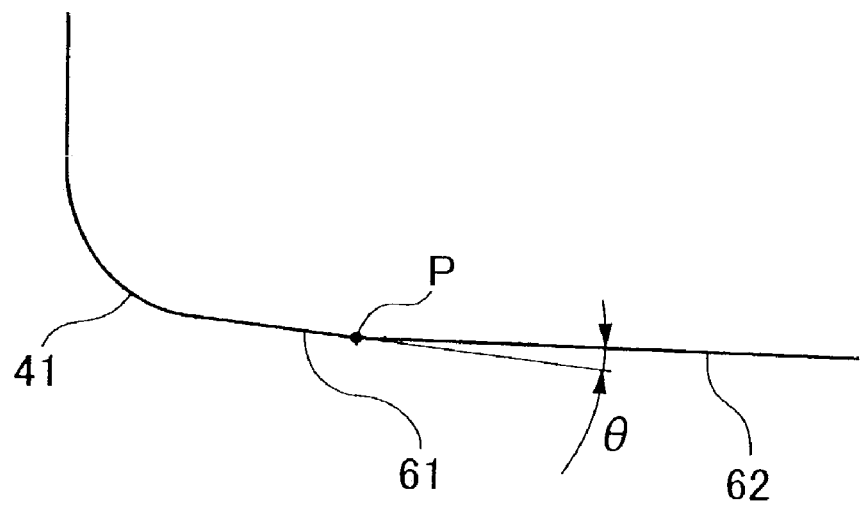
FIG. 9 is an enlarged view showing the vicinity of a connection point in the throwaway insert shown in FIG. 1 as viewed in a rotationally projected image.

The tapered cutting edge 61 is formed so as to be gradually and linearly away from the imaginary cylindrical surface S, along which the curved cutting edge 62 extends, toward the inside of the imaginary cylindrical surface S as the distance from the curved cutting edge 62 increases, and the distance from the nose portion 40 decreases. The tapered cutting edge 61 and the curved cutting edge 62 are not smoothly connected to each other, i.e., the respective tangents thereof drawn at the connection point P define a predetermined angle. FIG. 9 is an enlarged view showing the vicinity of the connection point P in the throwaway insert 1 as viewed in a projected image projected in the direction of rotation of the tool main body 200. As shown in FIG. 9, the tapered cutting edge 61 and the curved cutting edge 62 are formed such that the respective tangents drawn at the connection point P in the projected image define an angle θ, which is approximately 15 to 30 minutes. Moreover, the tapered cutting edge 61 and the cutting edge 41 of the nose portion 40 are formed in a plane so that the angle defined by the respective tangents of the tapered cutting edge 61 and the curved cutting edge 62 drawn at the connection point P is maximized not only as viewed in the projected image, but also as viewed in radial direction of the tool main body 200.

Figure 11:
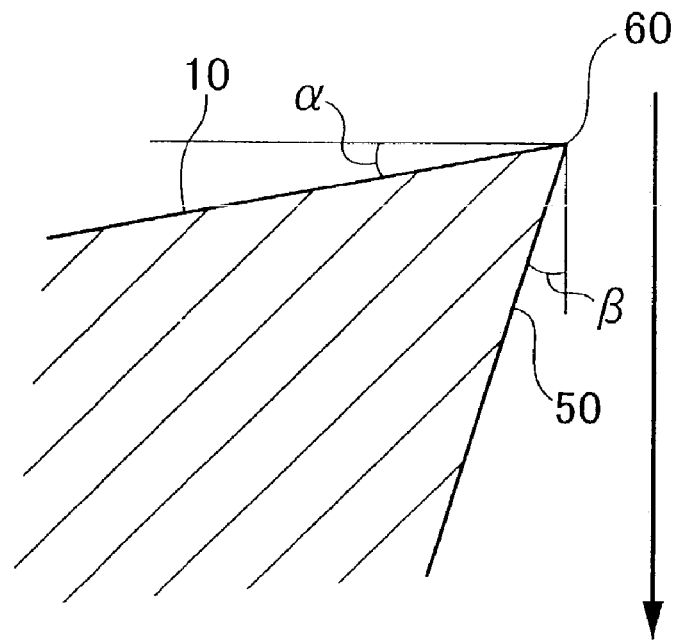
FIG. 11 is a partial cross-sectional view showing the major cutting edge of the throwaway insert shown in FIG. 1.

In addition, the rake angle α (see FIG. 11, in which the arrow indicates the direction along which a workpiece to be cut moves with respect to the throwaway insert) defined by a portion of the cutting face 10 that is connected to the major cutting edge 60 gradually increases as the cutting face 10 extends away from the proximal end of the tool main body 200 and toward the nose portion 40 as viewed in a state in which the throwaway insert 1 is attached to the tool main body 200. O the other hand, the flank angle β (see FIG. 11) defined by the flank 50 that is connected to the major cutting edge 60 gradually decreases as the flank extends away from the proximal end of the tool main body 200 and toward the nose portion 40.

Furthermore, there are formed second flanks 51, which function as to increase the flank angle, on respective portions, adjacent to the attaching surface 20, of the flanks 50 that are connected to the major cutting edge 60. The second flanks 51 are formed so as to fix the throwaway insert 1 to the tool main body 200 without looseness in such a manner that the second flank 51 of one of the major cutting edges 60 has surface contact with the tool main body 200 when the throwaway insert 1 is attached to the tool main body 200 as shown in FIG. 5, and the other of the major cutting edges 60 is disposed outer side.

As features other than that discussed above, in the middle of the cutting face of the insert body 100, there are formed a boss 12 and a through hole 90 extending from the cutting face 20 to the attaching surface 20. Moreover, at least the cutting face 10 is finished by lapping in order to prevent fused deposition of material when aluminum or the like is machined.

In addition, the outer surfaces of the projected portion 201 and pocket 202 provided at the distal end of the tool main body 200 are machined and finished by lathing, polishing, and lapping so that the surface roughness thereof is less than 3.2 μm when indicated by the Ry roughness, and consequently, the surfaces are plated with nickel or the like, and/or coated with material having lubricity such as DLC (Diamond-Like Carbon), WC/C (tungsten Carbide/Carbon), $MoS_2$, CrN, TiN, $Al_2O_3$, or the like.

Furthermore, the rotational diameter of the cutting edge of the cutting tool, i.e., the diameter of the imaginary cylindrical surface S whose center axis coincides with the axis of rotation X is indicated on the tool main body 200 as indicated by reference symbol 203. The rotational diameter of the cutting edge indicated by the indication 203 is, for example, the diameter of the imaginary cylindrical surface S actually measured in a state in which a master insert as a gauge for the throwaway insert 1 is attached to the tool main body 200. In the example shown in FIG. 13, the actual rotational diameter of the cutting edge is indicated as 39.952 mm, whereas the designed diameter is 40 mm. Note that the indication may be made by a marking such as a laser marking, or by stamping.

The throwaway insert 1 configured as described above is fixed to the tool main body 200 using a threaded element in such a manner that the nose portion 40 is positioned at the outer periphery of the distal end of the tool main body 200, that one of the pair of major cutting edges 60 is assigned as an outer peripheral cutting edge, that the minor cutting edge 80 connected to the nose portion 40 at the distal end is assigned as a front cutting edge, and that the attaching surface 20 is abutted against an attachment seat of the tool main body 200. In addition, the second flank 51, which is formed on the flank 50 connected to one of the pair of major cutting edges 60 disposed near the center of the tool main body 200, has surface contact with the tool main body 200, whereby the throwaway insert 1 is stabilized, and it is easy to adjust.

In a state in which the throwaway insert 1 is attached to the tool main body 200, the major cutting edge 60 is inclined so as to have a positive axial rake angle with respect to the axis of rotation of the tool main body 200 as viewed in side view, i.e., as viewed in a direction perpendicular to the axis of rotation of the tool main body 200 and parallel to the attachment surface 20. Because the tapered cutting edge 61 and the cutting edge 41 of the nose portion 40 are disposed in a plane, the axial rake angle is minimum at the vicinity of the nose portion 40 at the distal end, and the axial rake angle discontinuously changes at the connection point P transitioning to the curved cutting edge 62, whereby cutting force applied to the tapered cutting edge 61 and the curved cutting edge 62 also changes discontinuously. Because the curved cutting edge 62 is formed such that the distance from the attaching surface 20 gradually decreases as the distance from the nose portion 40 at the distal end increases, the axial rake angle of the curved cutting edge 62 is a positive value greater than the inclination angle of the attaching surface 20, whereby cutting force is reduced and it is possible to perform high speed cutting. Moreover, because the curved cutting edge 62 is projected in the direction of rotation of the tool main body 200, the convex surface 11, which is a cutting face connected to the curved cutting edge 62, also projects in the direction of rotation, whereby chip control can be improved when compared with the case in which a straight cutting edge is used instead of the curved cutting edge 62, and a flat cutting face is used.

Because the curved cutting edge 62 is formed so as to extend along a predetermined imaginary cylindrical surface S whose center axis coincides with the axis of rotation of the main body 200, as viewed in a state in which the throwaway insert 1 is attached to the tool main body 200, material contacting the imaginary cylindrical surface S can be cut out by the curved cutting edge 62 as the tool main body 200 rotates. At this time, because the generatrix of the imaginary cylindrical surface S is in parallel to the center axis thereof, a vertical wall is machined out. When a cutting operation is performed while the tool main body 200 is rotated and moved transversely, a wall perpendicular to the vertical wall is machined by the minor cutting edge 80. Moreover, the tapered cutting edge 61 is formed along the side edge closer to the nose portion 40 than from the curved cutting edge 62, and thus the tapered cutting edge 61 is deviated from the rotational locus of the curved cutting edge 62. Because the tapered cutting edge 61 is formed so as to gradually curve from the imaginary cylindrical surface S toward the inside of the imaginary cylindrical surface S as the distance from the curved cutting edge 62 increases, and the distance from the nose portion 40 decreases, the tendency is reduced for the metallic material located outwardly with respect to the nose portion 40 of the throwaway insert 1 to be pulled and plucked off with discharged chips in the vicinity thereof, and the tendency of the tip portion of the throwaway insert 1 to make an extra cut trace in the metallic material is also reduced. As a result, a vertical wall having a high quality machined surface can be obtained, and a high speed cutting operation can be performed due to reduced cutting force.

Furthermore, the tapered cutting edge 61 and the curved cutting edge 62 are connected to each other at the connection point P, and the angle formed by the tangent of the tapered cutting edge 61 drawn at the connection point P and the tangent of the curved cutting edge 62 drawn at the connection point P is preferably set to be approximately in a range from 0° 15' to 5°, and more preferably in a range from 0° 15' to 0° 30' as viewed in a rotationally projected image. As a result, the chip flow made by the curved cutting edge 62 and the chip flow made by the tapered cutting edge 61 are discontinuous at the connection point P; therefore, the chips made by the curved cutting edge 62 and the chips made by the tapered cutting edge 61 grow in different directions, which enables easy separation of these chips from each other. Consequently, the metallic material located outwardly with respect to the nose portion 40 is not pulled by the cut chips made by the curved cutting edge 62, and the tendency of the tip portion of the throwaway insert 1 to make an extra cut trace in the metallic material is effectively reduced, and thus a high speed cutting operation can be performed by improving chip dischargeability using the curved cutting edge 62 having a convex shape while interfering with an interaction between the chips made by the curved cutting edge 62 and the chips made by the tapered cutting edge 61.

In the throwaway insert 1, because the rake angle $\alpha$ gradually increases as the distance from the nose portion 40 decreases, while on the other hand, the flank angle $\beta$ gradually decreases as the distance from the nose portion 40 decreases, the radial rake angle and flank angle of the major cutting edge are prevented from greatly changing in the direction from the distal end to the proximal end of the cutting edge 60 when the throwaway insert 1 is attached to the tool main body 200 in such a manner that a positive axial rake angle is applied to the major cutting edge 60 as in the present embodiment, and as a result, an appropriate rake angle and a sufficient flank angle can be applied to the major cutting edge 60 along the entire length thereof.

According to the throwaway insert 1 of the present embodiment, it is possible to restrict change in the wedge angle of the major cutting edge 60 defined by the upper face as the cutting face 10 and the flank 50 in the direction from the distal end to the proximal end of the major cutting edge 60, and as a result, the strength of the cutting edge can be ensured along the entire length of the major cutting edge 60. Consequently, vibration due to insufficient rigidity of the cutting edge and chipping off of the cutting edge during a cutting operation can be avoided, and furthermore, an excellent cutting performance, such as reduced cutting force, can be obtained.

As explained above, according to the throwaway insert 1 of the present embodiment, a high speed machining of a metallic material, in particular, having great ductility, e.g., aluminum, can be performed due to an effective chip control. In addition, a vertical wall with a high quality machined surface can be cut out.

Figure 13:
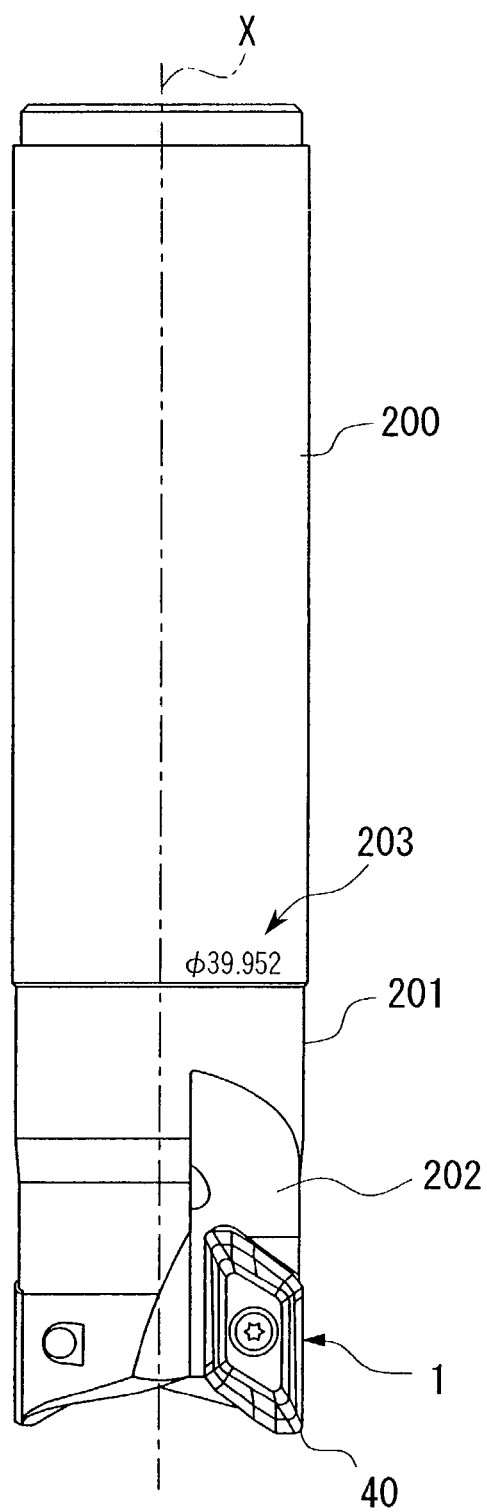
FIG. 13 is a front view showing a cutting tool according to the present invention.

Furthermore, as shown in FIG. 13, in the cutting tool of the present invention provided with the throwaway insert 1 according to the present embodiment, at least the surfaces of the projected portion 201 and pocket 202 provided at the distal end of the tool main body 200 are machined so that the surface roughness thereof is less than 3.2 μm when indicated by the Ry roughness, and consequently, the surfaces are plated and/or coated, while on the other hand, the throwaway insert 1 is finished by lapping. Accordingly, fused deposition of a metallic material having great ductility, e.g., aluminum during cutting, can be effectively prevented, which enables not only a high speed cutting operation, but also obtaining a vertical wall with a high quality machined surface.

Moreover, as shown in FIG. 13, in the cutting tool of the present embodiment, the tool main body 200 has the indication 203 indicating the diameter of the imaginary cylindrical surface S; therefore, when a cutting operation is performed using an NC machine tool to which the cutting tool of the invention is attached, and when a cutting operation program is corrected before the cutting operation in order to correct machining error due to variation in the diameter of the imaginary cylindrical surface S caused by manufacturing variation of an individual tool main body 200, i.e., due to variation in the rotational radius of the cutting edge, the correcting operation can be easily performed by correcting the program based on the indication 203 without necessity of actually measuring the rotational radius of the cutting edge. As in the embodiment shown in FIG. 13 in which the indication 203 is provided on the proximal end of the projected portion 201, i.e., the distal end of a shank of the tool main body 200, the indication 203 is preferably provided on a portion of the tool main body 200 which is visible even when the tool main body 200 is attached to the main spindle of a machine tool for a cutting operation. If the tool main body 200 is stored while the shank of the tool main body 200 is attached to a holder, and the holder is accommodated in a magazine, the indication 203 may be provided on the front surface of the distal end of the tool main body 200, because the indication 203 provided on the outer surface of the tool main body 200 is not easy to see.

Figure 10:
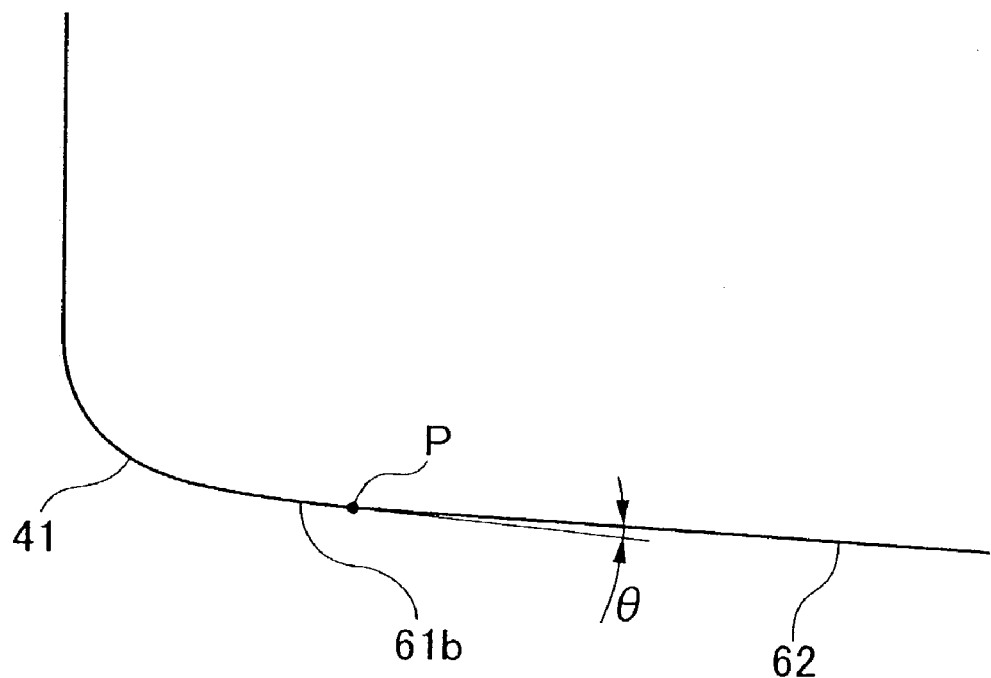
FIG. 10 is an enlarged view showing the vicinity of a connection point in the throwaway insert according to another embodiment of the present invention as viewed in a rotationally projected image.

In the above embodiment, the tapered cutting edge 61 is formed in a straight shape; however, the tapered cutting edge 61 may be formed in a curved shape as long as the tangent thereof drawn at the connection point P forms a predetermined angle with the tangent of the curved cutting edge 62 drawn at the connection point P. In particular, as an alternative embodiment shown in FIG. 10, if the tapered cutting edge 61b is formed so as to gently project toward the outside, a greater distance between the tapered cutting edge 61b and the imaginary cylindrical surface S in the vicinity of the nose portion 40 can be ensured when compared with the case in which the tapered cutting edge 61 having a straight shape is used, and also the tapered cutting edge 61b can be smoothly connected to the cutting edge 41 of the nose portion 40; therefore, the tendency of the tip portion of the throwaway insert to make an extra cut trace in the metallic material is effectively reduced.

Figure 12:
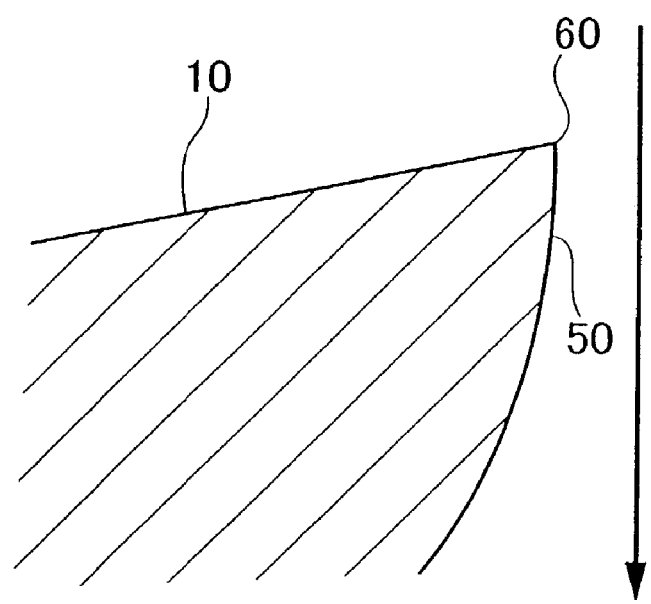
FIG. 12 is a partial cross-sectional view showing the major cutting edge of the throwaway insert according to another embodiment of the present invention.

As another alternative embodiment, as shown in FIG. 12, the flank angle defined by the flank 50 connected to the major cutting edge 60 may be formed so as to gradually increase as the distance from the major cutting edge 60 increases, and the distance from the attaching surface 20 decreases (see the arrow in FIG. 12). By incorporating this configuration, it is possible to ensure the flank angle without degradation of strength of the cutting edge.

Moreover, the tapered cutting edge 61 and the cutting edge 41 of the nose portion 40 are formed in a plane in the above embodiment; however, these are not necessarily formed in a plane. Nevertheless, if the tapered cutting edge and the cutting edge of the nose portion are formed in a plane, the intersecting angle at the connection point, which is formed by the tangent of the curved cutting edge having a predetermined axial rake angle and the tangent of the tapered cutting edge, can be maximized as viewed in the radial direction of the tool main body. Consequently, the cut chips made by the tapered cutting edge and the cut chips made by the curved cutting edge can be more easily separated due to the maximized effects of discontinuous change in cutting force applied to the tapered cutting edge and the curved cutting edge, and the tendency of the tip portion of the throwaway insert to make an extra cut trace in the metallic material is effectively reduced, which enables a high speed cutting operation.

In the description for the above embodiment, it is explained that the throwaway insert and cutting tool configured as explained above are specifically preferable for cutting aluminum and aluminum alloy; however, the throwaway insert and cutting tool of the present invention also enable a high efficiency machining for various materials to be cut, for example, steel, or difficult-to-machine materials such as titanium, titanium alloy, or heat resistant alloys. When a plunge machining was performed for S55C material (carbon steel for machine structural use) as an example, a machined surface having surface roughness of 0.005 mm in surface step was obtained, and cutting noise was extremely low. In the case of cutting a workpiece of titanium or titanium alloy, operating life of a throwaway insert is generally shortened due to cutting heat concentrating at a cutting point and cut chips because of low thermal conductivity, even though cutting force is not very high; however, by using the throwaway insert of the present invention, it is possible to prevent cutting heat concentration because generation of excessive heat can be avoided due to a very low cutting force, and because chip control is excellent as explained above. When a workpiece of Ti-6A14V was cut as an example, operating life of a throwaway insert was not shortened even though cutting speed, depth of cut, and feed per tooth were increased compared with a conventional cutting operation, efficiency of machining was improved by ten times or more, accuracy and surface roughness of the cut wall were good, and secondary negative effects due to extended chips were prevented because chips were not extended but were curled sharply. In the particular case in which a workpiece of titanium alloy, heat resistant alloy, or the like is cut, it is preferable to apply a small sized honing, for example, a rounded honing making a radius from approximately 0.01 mm to 0.03 mm, or chamfered honing having a size similar to the small rounded honing, to tips of the cutting edges such as the major cutting edge 60 including the tapered cutting edge 61 and curved cutting edge 62, the cutting edge 41 of the nose portion 40, and the minor cutting edge 80, and it is preferable to coat the surface of the insert body 100 with material such as (Al, Ti) N, TiC, TiN, or the like.

In the above description, the present invention is explained with reference to a specific embodiment; however, the present invention is not limited to the above embodiment. Accordingly, variations and modifications which could be derived from the above embodiment by a person skilled in the art should fall within the scope of the present invention. For example, the cutting tool of the present invention is provided with the throwaway insert of the present invention; however, a cutting tool provided with a conventional throwaway insert, as long as the surface roughness of the distal end of the tool main body is made to be less than 3.2 µm when indicated by the Ry roughness, can perform a high speed cutting of a metallic material having great ductility such as aluminum while preventing fused deposition, and while improving chip control. Accordingly, it is possible to cut out a vertical wall with a high quality machined surface. Therefore, a cutting tool in which the surface roughness of the distal end of tool main body thereof is made to be less than 3.2 µm when indicated by the Ry roughness, and a cutting tool in which the surface of the distal end of tool main body thereof is plated and/or coated with material having lubricity are included in the scope of the present invention.

Advantageous Effects Obtainable by the Invention

As explained above, in the throwaway insert according to the present invention, because the major cutting edge comprises the tapered cutting edge and the curved cutting edge, the curved cutting edge is formed so as to extend along an imaginary cylindrical surface whose center axis coincides with the axis of rotation of the tool main body, and the tapered cutting edge is formed so as to gradually curve from the imaginary cylindrical surface toward the inside of the imaginary cylindrical surface as the distance from the curved cutting edge increases, and the distance from the tip portion decreases, a vertical wall having a high quality machined surface can be obtained, and a high speed cutting operation can be performed.

Moreover, in the throwaway insert according to the present invention, because the major cutting edge comprises the tapered cutting edge and the curved cutting edge, the curved cutting edge is formed so as to extend along an imaginary cylindrical surface whose center axis coincides with the axis of rotation of the tool main body, the tapered cutting edge is formed so as to gradually curve from the imaginary cylindrical surface toward the inside of the imaginary cylindrical surface as the distance from the curved cutting edge increases, and the distance from the tip portion decreases, and the tapered cutting edge and the curved cutting edge of the major cutting edge are connected to each other at the connection point such that the respective tangents thereof drawn at the connection point form a predetermined angle, a vertical wall having a high quality machined surface can be obtained, and a high speed cutting operation can be performed.

Furthermore, in the throwaway insert according to the present invention, because the major cutting edge comprises the tapered cutting edge and the curved cutting edge, the curved cutting edge is formed so as to extend along an imaginary cylindrical surface whose center axis coincides with the axis of rotation of the tool main body, the tapered cutting edge is formed so as to gradually curve from the imaginary cylindrical surface toward the inside of the imaginary cylindrical surface as the distance from the curved cutting edge increases, and the distance from the tip portion decreases, the tapered cutting edge and the curved cutting edge of the major cutting edge are connected to each other at the connection point such that the respective tangents thereof drawn at the connection point form a predetermined angle, and the curved cutting edge is formed so as to project in-the direction of rotation of the tool main body, and is formed such that the distance from the attaching surface gradually decreases as the distance from the tip portion increases, a vertical wall having a high quality machined surface can be obtained, and a high speed cutting operation can be performed due to improved chip control.

Furthermore, in the throwaway insert according to the present invention, because the major cutting edge comprises the tapered cutting edge and the curved cutting edge, the curved cutting edge is formed so as to extend along an imaginary cylindrical surface whose center axis coincides with the axis of rotation of the tool main body, and so as to project in the direction of rotation of the tool main body, and the curved cutting edge is formed such that the distance from the attaching surface gradually decreases as the distance from the proximal end of the tool main body decreases, a high speed cutting operation can be performed due to improved chip control.

In the cutting tool provided with the throwaway insert according to the present invention at the distal end of the tool main body, because at least the surface of the distal end of the tool main body is machined so that the surface roughness thereof is less than 3.2 µm when indicated by the Ry roughness, a high speed cutting operation can be performed while preventing fused deposition of a metallic material having great ductility such as aluminum during cutting, which enables not only improving chip control, but also obtaining a vertical wall with a high quality machined surface.

In addition, by providing an indication of the diameter of the cylindrical surface which is formed by rotating the curved cutting edge about the axis of rotation of the tool main body, a cutting operation program can be easily corrected before the cutting operation; therefore, efficiency of operation can be improved.

What is claimed is:

1. A throwaway insert substantially formed in a polygonal shape comprising:
   a cutting face as an upper surface thereof;
   an attaching surface as a lower surface thereof for attaching to a tool main body;
   a flank as a side surface thereof formed between the cutting face and the attaching surface;
   a nose portion which is formed at a corner of the cutting face, and which has a substantially arc-shaped cutting edge; and
   a major cutting edge which is formed along an intersecting ridge between the cutting face and the flank so as to be connected to an end of the cutting edge of the nose portion, and which includes a tapered cutting edge connected to the cutting edge of the nose portion, and a curved cutting edge connected to an end of the tapered cutting edge at a connection point positioned opposite to the nose portion,
   wherein the curved cutting edge is formed so as to extend along an imaginary cylindrical surface whose center axis coincides with the axis of rotation of the tool main body, as viewed in a state in which the throwaway insert is attached to the tool main body in such a manner that the nose portion is positioned at an outer periphery of a distal end of the tool main body,
   wherein the tapered cutting edge is formed so as to gradually curve from the imaginary cylindrical surface toward the inside of the imaginary cylindrical surface as the distance from the curved cutting edge increases, and the distance from the nose portion decreases,
   wherein the tapered cutting edge and the curved cutting edge of the major cutting edge are connected to each other at the connection point such that the respective tangents thereof drawn at the connection point form a predetermined angle, and
   wherein the curved cutting edge is formed along a convex curve projecting in the direction of rotation of the tool main body when viewed in a radial direction of the tool main body, and is formed such that the distance from the attaching surface gradually decreases as the distance from the nose portion increases.

2. A throwaway insert according to claim 1, wherein the cutting edge of the nose portion and the tapered cutting edge are formed in a plane.

3. A throwaway insert according to claim 1,
wherein the cutting face connected to the major cutting edge is formed such that the rake angle thereof gradually increases as the cutting face extends toward the nose portion, and
wherein the flank connected to the major cutting edge is formed such that the flank angle of the flank gradually decreases as the flank extends toward the nose portion.

4. A throwaway insert according to claim 1, wherein the flank connected to the major cutting edge is formed such that the flank angle thereof gradually decreases as the flank extends away from the major cutting edge and toward the attaching surface.

5. A throwaway insert according to claim 1 further comprising:
another major cutting edge and another flank both of which are provided on a side opposite to the other major cutting edge; and
a pair of second flanks respectively formed on the flanks connected to the pair of major cutting edges and in the vicinity of the attaching surface so as to increase the flank angles of the flanks, wherein
the pair of second flanks are formed such that one of the second flanks corresponding to one of the pair of major cutting edges makes surface contact with the tool main body as viewed in a state in which the throwaway insert is attached to the tool main body in such a manner that the other of the pair of major cutting edges is positioned at an outer periphery of the tool main body.

6. A throwaway insert according to claim 1, wherein at least the cutting face is finished by lapping.

7. A cutting tool comprising:
a tool main body; and
a throwaway insert according to claim 1 provided at the distal end of the tool main body.

8. A cutting tool according to claim 7, wherein the diameter of the imaginary cylindrical surface is indicated on the tool main body.

9. A cutting tool according to claim 7, wherein the surface roughness of the distal end of the tool main body is less than 3.2 $\mu$m when indicated by the Ry roughness.

10. A throwaway insert comprising:
a cutting face as an upper surface thereof;
an attaching surface as a lower surface thereof for attaching to a tool main body;
a flank as a side surface thereof formed between the cutting face and the attaching surface; and
a major cutting edge which is formed along an intersecting ridge between the cutting face and the flank, and which includes a curved cutting edge,
wherein the curved cutting edge is formed so as to extend along an imaginary cylindrical surface whose center axis coincides with the axis of rotation of the tool main body, as viewed in a state in which the throwaway insert is attached to the tool main body, and
wherein the curved cutting edge is formed along a convex curve projecting in the direction of rotation of the tool main body when viewed in a radial direction of the tool main body, and is formed such that the distance from the attaching surface gradually decreases as the distance from a proximal end of the tool main body decreases.

11. A cutting tool comprising:
a tool main body; and
a throwaway insert according to claim 10 provided at the distal end of body.

12. A cutting tool comprising:
a tool main body, wherein the surface roughness of a distal end of the tool main body is less than 3.2 $\mu$m when indicated by the Ry roughness; and
a throwaway insert provided at the distal end of the tool main body;
wherein the throwaway insert is substantially formed in a polygonal shape and the throwaway insert includes:
a cutting face as an upper surface thereof;
an attaching surface as a lower surface thereof for attaching to a tool main body;
a flank as a side surface thereof formed between the cutting face and the attaching surface;
a nose portion which is formed at a corner of the cutting face, and which has a substantially arc-shaped cutting edge; and
a major cutting edge which is formed along an intersecting ridge between the cutting face and the flank so as to be connected to an end of the cutting edge of the nose portion, and which includes a tapered cutting edge connected to the cutting edge of the nose portion, and a curved cutting edge connected to an end of the tapered cutting edge at a connection point positioned opposite to the nose portion,
wherein the curved cutting edge is formed so as to extend along an imaginary cylindrical surface whose center axis coincides with the axis of rotation of the tool main body, as viewed in a state in which the throwaway insert is attached to the tool main body in such a manner that the nose portion is positioned at an outer periphery of a distal end of the tool main body, and
wherein the tapered cutting edge is formed so as to gradually curve from the imaginary cylindrical surface toward the inside of the imaginary cylindrical surface as the distance from the curved cutting edge increases, and the distance from the nose portion decreases.

* * * * *